US011909309B2

(12) United States Patent
Twelkemeijer et al.

(10) Patent No.: US 11,909,309 B2
(45) Date of Patent: Feb. 20, 2024

(54) STABLE SWITCHING FOR A POWER FACTOR CORRECTION BOOST CONVERTER USING AN INPUT VOLTAGE AND AN OUTPUT VOLTAGE

(71) Applicant: NXP USA, Inc., Austin, TX (US)

(72) Inventors: Remco Twelkemeijer, Wijchen (NL); Wilhelmus Hinderikus Maria Langeslag, Wijchen (NL)

(73) Assignee: NXP USA, Inc., Austin, TX (US)

( * ) Notice: Subject to any disclaimer, the term of this patent is extended or adjusted under 35 U.S.C. 154(b) by 327 days.

(21) Appl. No.: 17/478,500

(22) Filed: Sep. 17, 2021

(65) Prior Publication Data
US 2023/0086600 A1 Mar. 23, 2023

(51) Int. Cl.
*H02M 1/32* (2007.01)
*H02M 1/42* (2007.01)
(Continued)

(52) U.S. Cl.
CPC ....... *H02M 1/4225* (2013.01); *H02M 1/0009* (2021.05); *H02M 1/08* (2013.01); *H02M 1/32* (2013.01)

(58) Field of Classification Search
CPC .... H02M 1/4225; H02M 1/0009; H02M 1/08; H02M 1/32; H02M 1/0003; Y02B 70/10
See application file for complete search history.

(56) References Cited

U.S. PATENT DOCUMENTS

| 2003/0034760 A1* | 2/2003 | Hwang | H02M 3/156 323/224 |
| 2012/0049772 A1* | 3/2012 | Moussaoui | H02M 3/1588 318/376 |

(Continued)

FOREIGN PATENT DOCUMENTS

| EP | 2187511 A2 | 5/2010 |
| EP | 2187511 A3 | 5/2010 |
| KR | 10-2020-0024449 A | 3/2020 |

OTHER PUBLICATIONS

Grote, T. et al.; "Digital Control Strategy for Multi-Phase Interleaved Boundary Mode and DCM Boost PFC Converters"; 2011 IEEE Energy Conversion Congress and Exposition; Sep. 17, 2011; pp. 3186-3192.

(Continued)

*Primary Examiner* — Kyle J Moody
*Assistant Examiner* — Jye-June Lee

(57) ABSTRACT

Stable switching is disclosed for a power factor correction boost converter using an input voltage and an output voltage. In one example, a boost converter control system includes a gate driver coupled to a switch of a boost converter to generate a drive signal to control switching of the switch, wherein a period of the drive signal is adjusted using a current adjustment signal. A current control loop is coupled to the gate driver to receive a sensed input current from the boost converter and a desired input current and to generate the current adjustment signal to the gate driver. A current limiter is coupled to the gate driver and the current control loop to determine a duty cycle of the switch, to determine a maximum input current in response to the duty cycle, and to restrict the desired input current to below the maximum input current.

20 Claims, 11 Drawing Sheets

(51) Int. Cl.
*H02M 1/00* (2006.01)
*H02M 1/08* (2006.01)

(56) References Cited

U.S. PATENT DOCUMENTS

| | | |
|---|---|---|
| 2016/0036324 A1 | 2/2016 | Hofmann et al. |
| 2020/0186024 A1* | 6/2020 | Choi ................. H02M 1/32 |
| 2021/0296981 A1* | 9/2021 | Neudorf .............. H02M 1/32 |
| 2023/0124775 A1* | 4/2023 | Mino ................. H02M 1/32 |
| | | 363/13 |
| 2023/0275425 A1* | 8/2023 | Zhao ................ H02H 7/1213 |
| | | 361/93.9 |

OTHER PUBLICATIONS

Bento, Aluisio A. M. et al. "Reducing Inductor Size and Current Ripple in an AC-AC Converter by Interleaved Switching Strategy", Downloaded on Apr. 24, 2021 from IEEE Xplore, (2006), 7 pgs.

Cao, Guoen et al. "A Novel Critical-Conduction-Mode Bridgeless Interleaved Boost PFC Rectifier", The 2014 International Power Electronics Conference, (2014), 6 pgs.

Tomioka, Satoshi et al. "Interleaved-Boost-Input Type Isolated Full Bridge PFC Converter", IEEE PEDS 2005, Downloaded on Apr. 24, 2021 from IEEE Xplore, 6 pgs.

Balestero, Juan Paulo Robles et al. "Power Factor Correction Boost Converter Based on the Three-State Switching Cell", IEEE Transactions on Industrial Electronics, vol. 59, No. 3, Mar. 2012, 13 pgs.

* cited by examiner

STABLE SWITCHING FOR A POWER FACTOR CORRECTION BOOST CONVERTER USING AN INPUT VOLTAGE AND AN OUTPUT VOLTAGE

BACKGROUND

Electric power conversion is widely used in varied applications including adjustable-speed electric motor drives, switch-mode power supplies, uninterrupted power supplies (UPSs), and battery energy storage. In high-power applications, two or more boost converters are often combined as multiple stages to improve the performance and reduce the size of a power converter. For high-current applications and voltage step-up, the currents through the solid-state switches are just fractions of the input current. The switches are used to time the power phase of the converter. Power Factor Correction (PFC) converters are used for improved power quality and improved efficiency. Passive PFC may be performed using tuned LC filters, but these may have a limited frequency and power range. Active PFC uses actively controlled solid-state switches in association with passive elements. The switches allow the PFC converter to operate in different modes. A PFC boost converter boosts the input voltage for a higher output voltage.

SUMMARY

A method and apparatus are described for stable switching of a power factor correction boost converter using an input voltage and an output voltage. In one example, a boost converter control system includes a gate driver coupled to a switch of a boost converter to generate a drive signal to control switching of the switch, the drive signal having a period and an ON time, wherein a period of the drive signal is adjusted using a current adjustment signal. A current control loop is coupled to the gate driver to receive a sensed input current from the boost converter and a desired input current and to generate the current adjustment signal to the gate driver. A current limiter is coupled to the gate driver and the current control loop to determine a duty cycle of the switch, to determine a maximum input current in response to the duty cycle, and to restrict the desired input current to below the maximum input current.

In some embodiments, the current limiter determines the duty cycle of the switch by comparing the drive signal period and the drive signal ON time. In some embodiments, the boost converter has a power phase with a primary stroke during the drive signal ON time during which the switch of the boost converter is enabled and a secondary stroke during which the switch of the boost converter is not enabled, wherein comparing the drive signal period and the drive signal ON time comprises comparing a duration of the primary stroke and a duration of the power phase.

In some embodiments, the current limiter is coupled to a sensor of the boost converter to receive a measurement of the duration of the power phase. In some embodiments, the sensor comprises a current sensor to measure the sensed input current. In some embodiments, the sensor comprises a current sensor coupled to an inductor of the boost converter. In some embodiments, the sensor comprises a voltage detector coupled to a drain of the switch of the boost converter.

In some embodiments, the current limiter determines the duty cycle of the switch by comparing an input voltage of the boost converter and an output voltage of the boost converter. In some embodiments, the maximum input current is proportional to the duty cycle. In some embodiments, the current limiter further determines a minimum input current and wherein the current limiter selects the greater of the maximum input current and the minimum input current as the maximum input current. In some embodiments, the minimum input current is a pre-determined constant.

In some embodiments, the current limiter further determines when the boost converter is operating in a continuous conduction mode and wherein the current limiter restricts the desired input current only in response to the boost converter operating in the continuous conduction mode.

In some embodiments, the current limiter determines when the boost converter is operating in a continuous conduction mode by receiving a signal from the gate driver.

In some embodiments, the current limiter further determines when the boost converter is operating in a continuous conduction mode, wherein the current limiter is further to send a value for a requested drive signal period to the gate driver when the boost converter is operating in the continuous conduction mode, and wherein the drive signal period is determined by the drive signal period value. Some embodiments further include a voltage control loop to regulate an output voltage of the boost converter using a sensed output voltage of the boost converter. In some embodiments, the sensed input current is determined by sensing current though a coil of the boost converter.

In an embodiment, a method includes receiving a sensed input current from a boost converter, determining a duty cycle of a switch, determining a maximum input current using the duty cycle, restricting a desired input current to below the maximum input current, generating a current adjustment signal using the sensed input current and the desired input current, and generating a drive signal to control switching of the switch of the boost converter, the drive signal having a period and an ON time, wherein the period of the drive signal is adjusted using the current adjustment signal.

In some embodiments, determining the duty cycle comprises comparing the drive signal period and the drive signal ON time.

In some embodiments, comparing the drive signal period and the drive signal ON time comprises comparing a duration of a primary stroke during the drive signal ON and a duration of a power phase of the boost converter, the power phase including the duration of the primary stroke during which the switch of the boost converter is enabled and a secondary stroke during which the switch of the boost converter is not enabled.

In some embodiments, determining the duty cycle comprises comparing an input voltage of the boost converter and an output voltage of the boost converter.

DETAILED DESCRIPTION

Figure 1:
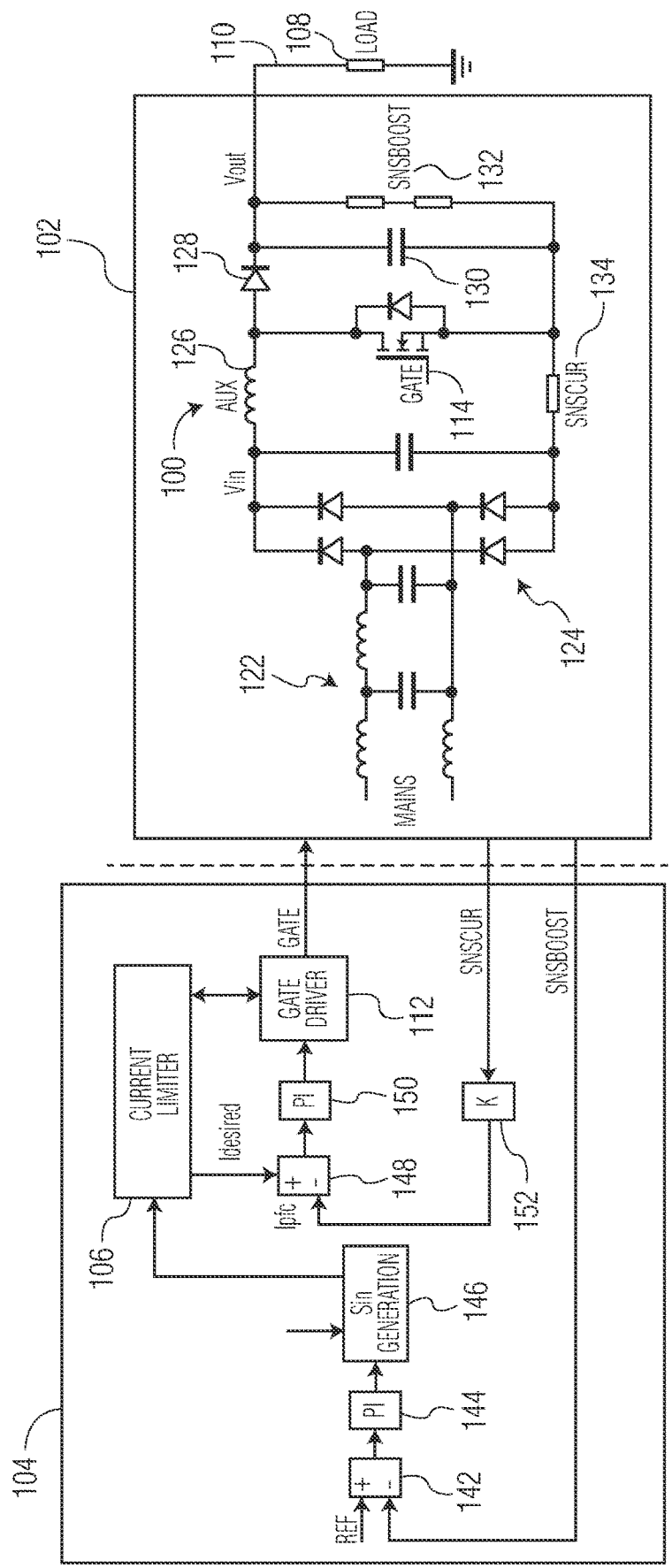
FIG. 1 is a block diagram of a boost power factor correction converter and a controller.

It will be readily understood that the components of the embodiments as generally described herein and illustrated in the appended drawings could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

A PFC boost converter has a converter that can be switched on and off to regulate the ON times of the converter power flow. As described herein, the ON time has two dimensions. The first is the duration that a converter is drawing power from the input. In a simple single MOSFET (Metal Oxide Semiconductor Field Effect Transistor) switch converter circuit, this ON time is the time during which the switch or MOSFET gate is ON. The second dimension is the time at which the gate is switched ON. This is directly related to the phase and period of the converter switch.

FIG. 1 is a block diagram of a boost power factor correction (PFC) converter and a controller. An application 102 includes a boost converter 100 to produce a power output 110 that is coupled to drive a load 108. The boost converter 100 is controlled by a PFC controller 104 that includes a gate driver 112 to drive a gate of the switch 114 of the boost converter 100. The gate driver 112 is coupled to a current limiter 106 of the PFC controller 104 to limit the current produced at the power output 110. In the case of a boost converter 100, the PFC controller is a boost converter control system.

The application 102 is shown in a simplified form and includes a mains filter 122 coupled to a suitable power source such as an alternating current (AC) mains power source. The application has a diode bridge rectifier 124 that receives the AC input from the mains filter and generates a direct current (DC) output. The mains voltage typically alternates at 50 or 60 Hz or some other value in the range of tens of Hertz. The mains filter 122 includes two filter capacitors at the voltage input before the rectifier and a filter capacitor after the rectifier before the boost converter 100. The particular configuration of the filter circuit and rectifier circuit may be modified to suit different implementations. The filtered rectified DC output is provided to the boost converter 100 component of the application 102. The boost converter 100 has a coil 126, a switch 114, a diode 128, and an output capacitor 130.

The boost converter 100 receives the rectified input voltage at the coil 126 that is coupled to the drain of the switch 114 and to a series output diode 128. The source of the switch 114 is coupled to the rectified input voltage and to ground. The power output 110 is filtered by the output capacitor 130 that is parallel to the switch and grounded. The switch 114 is in the form of a metal oxide semiconductor field effect transistor (MOSFET), however, other switches may be used for example, GaN or SiC, among others, to suit different loads and input voltages. The boost converter configuration is provided as an example and other converter configurations may be used. The application 102 may include more converters, also referred to as slices. Only one is shown here so as not to obscure other features of the invention. While and AC-DC boost converter is shown with a diode bridge rectifier, other types of rectifiers may be used. Alternatively, the input power may be DC for a DC-DC boost converter in which case no rectifier is required.

The gate driver 112 is coupled to the switch 114 of the boost converter 100 to generate a drive signal to control the switching of the switch. During the drive signal ON time, the gate of the boost converter 100 is enabled, current flows through the gate, and a power phase starts with a primary stroke as power is drawn from the input and stored in the inductor. During the drive signal OFF time, the gate of the boost converter 100 is not enabled and current does not flow through the gate. This is a secondary stroke of the power phase during which power is drawn from the input and delivered to the output. Also, the energy stored in the inductor is delivered to the output. When the current becomes zero, a ringing phase starts.

The PFC controller 104 receives feedback signals from the application 102. The output voltage 132 is sensed near the application output at a voltage detector. This signal is labeled as SnsBoost for convenience herein. As shown, the voltage is sensed at a voltage divider coupled between the power output 110 and ground. The source current 134 of the boost converter 100 is sensed by a current sensor between the source of the switch 114 and the rectified input voltage across a load. This sensed current represents current to the switch of the boost converter. This signal is labeled as SnsCur for convenience herein. The voltage at the coil 126 may also be measured. This signal is labeled as AUX for convenience.

The PFC controller uses these feedback signals, SnsBoost, SnsCur, and AUX to drive the switch 114 of the boost converter 100. The gate driver 112 generates a drive signal, labeled as GATE, that is coupled to the gate of the switch 114. The timing and duration of the drive signal controls the operation of the boost converter 100. The gate driver 112 may control multiple converters in which case the timing and duration of the drive signals will also control the relative phase between the multiple converters.

Within the gate driver 112, a differential ON time generation circuit receives an ON time input from an external controller (not shown). With multiple converters (not shown), it also receives a phase control output from a phase control loop. This information is used to generate an ON time to control the duration during which the boost converter is switched ON. In some embodiments the ON time input is a current or a voltage or a digital value. The ON time is connected to a cycle-by-cycle controller that generates the drive signal with a suitable timing based on the input from the control loops described below. The drive signal has a period and an ON time.

There are two control loops inside the PFC controller. An outer control loop is a voltage control loop that drives the output voltage 132 of the boost converter 100 to a desired value (e.g., 400V). The outer control loop receives the output voltage 132 as SnsBoost from the boost converter 100 and compares the voltage to a reference voltage, Ref, at an outer difference circuit 142 which generates an error signal to indicate the difference. The outer difference circuit 142 is coupled to an outer proportional integrator 144 that receives the error signal. The outer proportional integrator 144 is coupled to a current generator 146. The current generator 146 receives the mains voltage and uses the outer proportional integrator output to generate a desired current value. The current generator 146 is coupled to the current limiter 106 which adjusts the desired current and applies the resulting desired current value to the inner control loop.

The inner control loop is a current control loop that regulates the input current of the boost converter 100 to the desired current (Ides) from the current limiter. In general, the Ides has a sine wave shape which can be generated internally, but can also be derived from the mains voltage. The inner control loop receives the source current 134 as a SnsCur signal from the boost converter 100. The source current 134 may be received as a voltage and then scaled by K 152 to a suitable current Ipfc. In some embodiments, Ipfc is the current through the boost converter coil 126 which flows through the resistor at which the source current 134 is measured. This current, Ipfc is compared to the desired current (Ides) at an inner difference circuit 148. The inner difference circuit 148 generates an error signal and is coupled to an inner proportional integrator 150 which integrates the error signal from the inner difference circuit 148 and provides the integrated value to the gate driver 112. The gate driver 112 uses the integrated value to determine timing and duration of the drive signal, labelled as GATE, to the gate of the switch 114 of the boost converter 100. The period and ON time of the drive signal are adjusted using the received values from the inner control loop and the outer control loop. While the control loops are shown as using an error signal with proportional integration, any of a variety of other control loop configurations may be instead and in addition.

Figure 2:
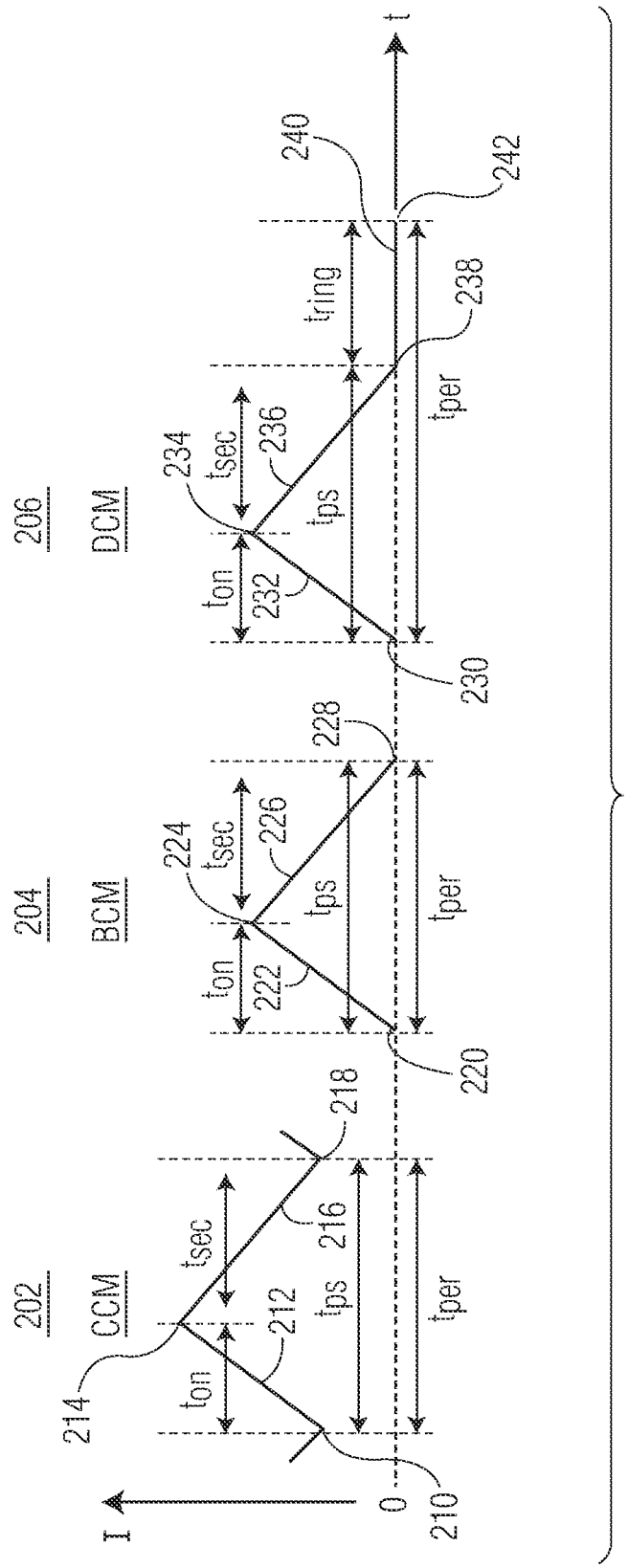
FIG. 2 is a graph of three different operational modes of a boost converter.

FIG. 2 is a graph of three different operational modes of a PFC converter, for example as in FIG. 1 and variations thereof. The graph shows inductor current of one of the converters on the vertical axis against time on the horizontal axis. The solid-state switches of an interleaved PFC boost converter allow the converter to be operated in different modes. For medium and high-power applications, a CCM (Continuous Conduction Mode) is used often.

The first mode 202 represents CCM in which the inductor current never reaches zero and so the converter is conducting continuously. At the start of a power phase 210, the inductor current has reached its lowest point and the cycle-by-cycle controller turns the gate of the converter switch to ON. The inductor current increases through a primary stroke 212 reaching a peak at a point 214 corresponding to the transition to a secondary stroke. The duration of the primary stroke is the gate ON time indicated as $t_{on}$. After the gate is switched off the current declines through the secondary stroke 216 until the end of the period of the power cycle as defined by the primary stroke and the secondary stroke. The end of the second stroke 218 corresponds to the beginning of the next cycle period and the start of the next primary stroke. The cycle period of the switch corresponds to frequency on the order of KHz as compared to the tens of Hertz of an input AC voltage.

If the entire cycle period of the switch is viewed as 360 degrees by analogy to sine waves, 180 degrees is exactly the middle. If the two converters are interleaved so that the primary stroke of the second converter starts at the midpoint of the cycle period of the second converter and the point 214 is exactly in the middle, then the input current of the interleaved converter will be approximately a constant current. As the first converter inductor current is decreasing, the second converter inductor current is increasing. The position of the peak at the point 214 is dependent on input voltage and output voltage of the converter at low mains voltages, the peak is closer to the end and at high mains voltages, the peak is closer to the beginning. The output voltage is controlled to a value, the ripple voltage, caused by switching, for example may be further reduced with additional filtering as appropriate.

The second mode 204 is commonly referred to as BCM (Boundary Conduction Mode) or sometimes as CrCM (Critical Conduction Mode). In this mode, the primary and secondary stroke are very similar except that the gate of the converter switch is only turned ON when the inductor current reaches zero. The initial zero crossing 220 is the beginning of the primary stroke 222 of the ON time in the BCM mode 204. At the peak current time 224 the transition is made and the switch is set to OFF. The inductor current decreases during the secondary stroke 226 until a zero crossing 228. The period in BCM mode may be increased by increasing the ON time and thereby increasing duration of the primary stroke and the peak voltage. The secondary stroke will accordingly become longer as well. Increasing the period also increases the inductor current as the current becomes higher during the longer primary stroke. The described controller of FIG. 1 may be used to change the ON time of a primary or master converter to increase or decrease the inductor current and the period. The secondary or slave converter may be matched to that period time or ON duration by adjusting the ON time of both converters, e.g., increasing the $t_{on}$ of one converter while decreasing the $t_{on}$ of the other converter. The timing may be adjusted through the phase detector and phase controller until the entire period is aligned to be out of phase with the first converter. In some embodiments, the phase between the two interleaved converters is aligned by adjusting only the duration of the switch ON time of both converters. This does not necessarily require adjustments to a ringing phase of the converters.

The third mode 206 is commonly referred to as DCM (Discontinuous Conduction Mode) because the inductor current, or input current, has a dead time interval during which no power is delivered. There is an added delay after the secondary stroke before the next primary stroke. In the DCM mode 206, the first stroke begins at a zero inductor current crossing time 230 with the switch turned ON. The primary stroke 232 extends through a current rise time and a peak inductor current 234 at which the switch ON time is ended and the inductor current falls during the second stroke 236 to a zero inductor current crossing 238. Instead of starting the next period at the end of this power phase, the switch remains off for an additional time 240 during a ringing phase. The end of the ringing phase is the end of the period 242 at which time the next power phase begins with another primary stroke 232 by turning the switch to ON with a drive signal from the cycle-by-cycle converter.

The power phase may be considered as the time during which power is drawn from the input node. The ringing phase is a time during which the inductor current is ringing around zero current due to the inductor value and the capacitance of the physical circuit. The drain voltage of the MOSFET switch rings around the input voltage in this phase. If the amplitude of the drain voltage ringing is below the threshold of the output diode, then no power will reach the output node during the ringing phase.

Many interleaved boost power factor correction (PFC) converter control systems currently support only BCM to make the phase equal to 180 degrees. With an interleaved boost PFC converter operating in DCM with valley switching, the 180 degree phase difference can be lost at lower switching frequencies due to the feedbacks of the capacitors in the filter circuits. This can occur in BCM and DCM but may be worse in DCM for which the switching frequencies may be lower.

Considering the BCM and DCM modes, the switching frequency of the gate drops as the input voltage or mains voltage, Vin, is close to the output voltage, Vout, of the converter. In BCM and DCM modes, the gate is not switched until the PFC current goes to zero. This marks the end of the period, $t_{per}$, after which the gate may switch back on for the start of the primary stroke, $t_{on}$. This low switching frequency is undesirable for several reasons. The following graphs illustrate how the switching frequency is low under various operating parameters.

The average PFC converter output current in BCM mode, $I_{pfc\_bcm\_avg}$, may be defined as follows:

$$I_{pfc\_bcm\_avg} = \frac{t_{on\_act} \cdot V_{in}}{2 \cdot L_{pfc}} \quad \text{(Eq. 1)}$$

Where $t_{on\_act}$ is the actual duration of the power phase, or actual ON time, of the converter switch, Vin is the mains or other input voltage, and $L_{pfc}$ is the inductance in the coil of the PFC converter.

The actual ON time, $t_{on\_act}$, in BCM may be defined as follows:

$$t_{on\_act} = t_{per\_bcm} \cdot \delta_{ccm} \quad \text{Eq. (2)}$$

Where the duty cycle in CCM, $\delta_{ccm}$, may be defined as follows:

$$\delta_{ccm} = \frac{V_{out} - V_{in}}{V_{out}} = \frac{t_{on\_act}}{t_{ps}} \rightarrow V_{in} = V_{out}(1 - \delta_{ccm}) \quad \text{Eq. (3)}$$

Where Vout is the output voltage of the converter, and $t_{ps}$ is the full cycle time of the power phase including the primary and secondary strokes.

This definition of $\delta_{ccm}$ may be used to derive a time for a period of the BCM cycle, $t_{per\_bcm}$, that may be defined in terms of the inductor current of the PFC converter, $I_{pfc}$:

$$t_{per\_bcm} = \frac{I_{pfc\_bcm\_avg} \cdot 2 \cdot L_{pfc}}{V_{out}(1 - \delta_{ccm}) \cdot \delta_{ccm}} \quad \text{(Eq. 4)}$$

Figure 3:
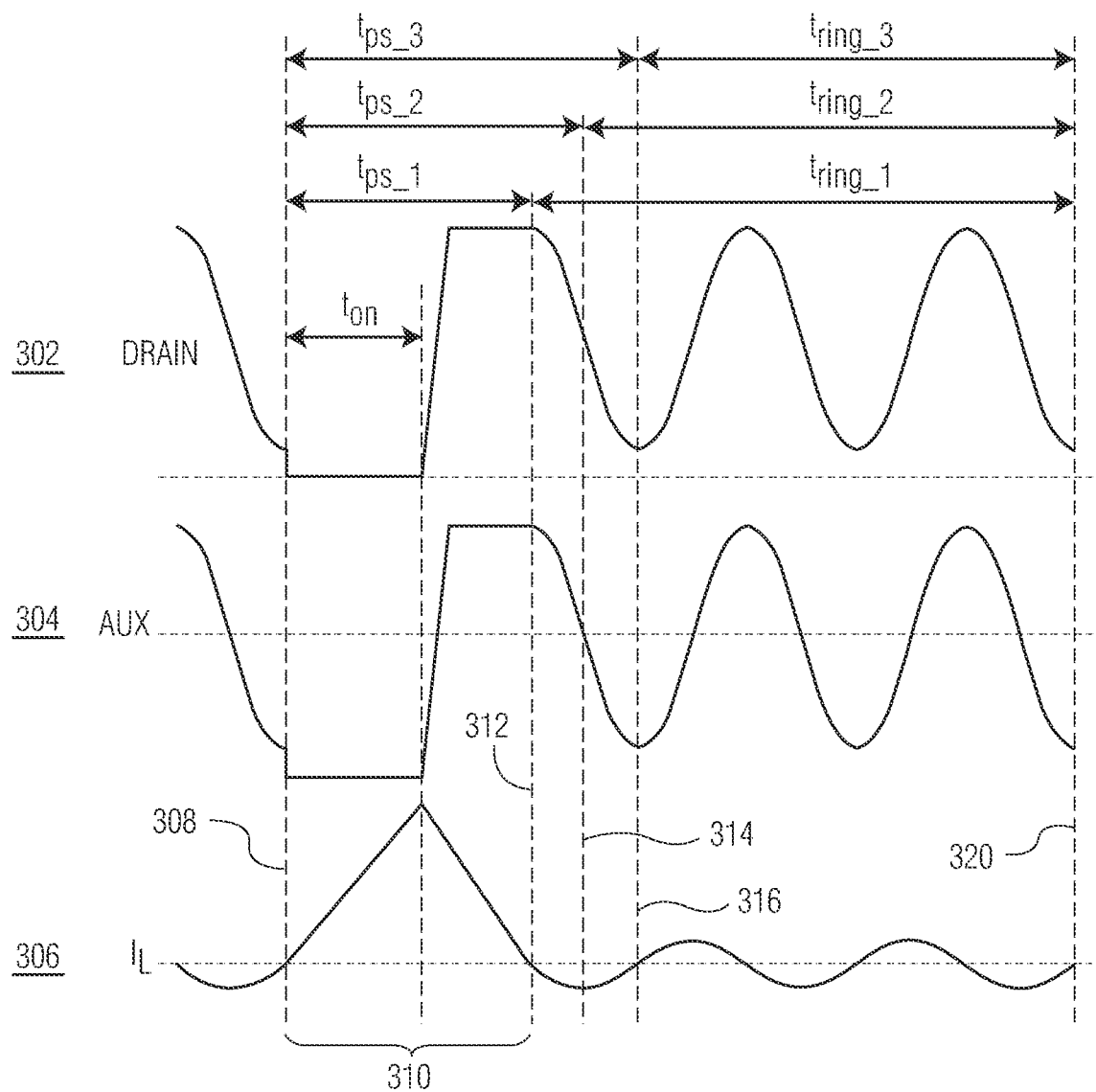
FIG. 3 is a graph of three signals on the same time scale that may be used to determine a duty cycle.

FIG. 3 is a graph of time on the horizontal axis and three aligned signals on the vertical axis that may be used to determine the duty cycle, $\delta_{CCM}$. The three signals include the voltage measured at two different locations and the measured inductor current, any or all of which may be used to measure the $t_{ps}$ and $t_{on}$ by different definitions. At 302, the drain voltage of a gate of a converter is graphed on the vertical axis against time on the horizontal axis. At time 308 a power phase 310 begins with the gate enabled or ON. This instant is used as the start time for $t_{on}$ and for the $t_{ps}$ measurement although other times may be used instead. The gate is enabled for a time determined as $t_{on}$ and then it is disabled at a time 308 which is the end of $t_{on}$. The drain voltage immediately rises. The end of the power phase and of the $t_{ps}$ period is also the start of the ringing phase $t_{ring}$ in DCM. The end may be measured in different ways. One suitable event is when the drain voltage begins to fall as shown at time 312 and indicated as $t_{ps\_1}$. Another suitable event is when the drain voltage goes to the input voltage Vin or when the minimal ringing value (valley) as shown at time 318 and indicated as $t_{ps-3}$.

The voltage of the auxiliary winding of the inductor or coil of a converter is shown as AUX 304. This voltage is similar to that of the drain and the same suitable occurrences apply as with the drain voltage. The shape of the curve is the same as for the drain voltage only the average value of the drain voltage 302 is Vin and the average voltage value of AUX 304 is 0. The zero crossing 316 of the voltage at AUX 304, indicated as $t_{ps\_2}$, is a good end time for the power phase. When the inductor auxiliary winding voltage of the converter goes to zero, the zero crossing is easy to detect. The zero crossing is also a local minimum of the inductor auxiliary winding voltage.

At 306 the inductor current is shown on the vertical axis against time. At the time 312 when the power phase 310 ends, the inductor current has a zero crossing. The inductor current goes to zero at this crossing. It then starts ringing and has a second zero crossing 316 at a second later time. This time corresponds to a first valley in the ringing voltage of the drain voltage 302 and the inductor auxiliary winding voltage, AUX 304. Any one or more of these events may be used to determine an end time for the power phase, indicated as $t_{ps}$.

In DCM, there is a ringing phase and the end of the ringing phase 320 marks the beginning of the next power phase. The interval from the start or rising edge of the first power stroke at 308 and the rising edge of the next power stroke at 320 is one complete switching cycle or a period time of the converter, indicated as the period time, tper, and variations thereon. The gate is then enabled again for another switching cycle. In BCM, there is no ringing phase and the end of the power phase, $t_{ps}$, marks the beginning of the next power phase and the completion of a switching cycle tper. In CCM, there is no ringing phase and the voltage or current may not fall to any particular value. The duration of the ON time is regulated to control the output of the converter and the duration of the power phase which corresponds to the period time, tper.

PFC controllers that are designed to switch in DCM or BCM could have irregular switching behavior when the input voltage, Vin, of the boost converter is close to the output voltage, Vout. This is caused at least in part due to switching when the PFC converter current or source current is not zero. By definition DCM and BCM do not begin the next cycle period until the current goes to zero. When the PFC controller makes use of time-outs or waits until the PFC current is zero before the next cycle period starts, the cycle period may become too long. In other words, the switching frequency may become too low. A low switching frequency may cause an oscillation in the mains filter which causes harmonic distortion and increases the audible noise. In the case of an interleaved PFC controller where the boost converter are to switch at 180 degrees, the phase becomes out of control leading to unstable operation. The low frequency operation may be avoided by operating in CCM when the input voltage is close to the output voltage. Alternatively, the low frequency operation can also be avoided by using a current limiter, which actively reduces the PFC current resulting in a higher switching frequency. The current limiter may also be used in other modes. Also safely switching in CCM provides a significant improvement in total harmonic distortion (THD) for the application. Both methods avoid mains filter oscillations and decrease the audible noise.

Figure 4:
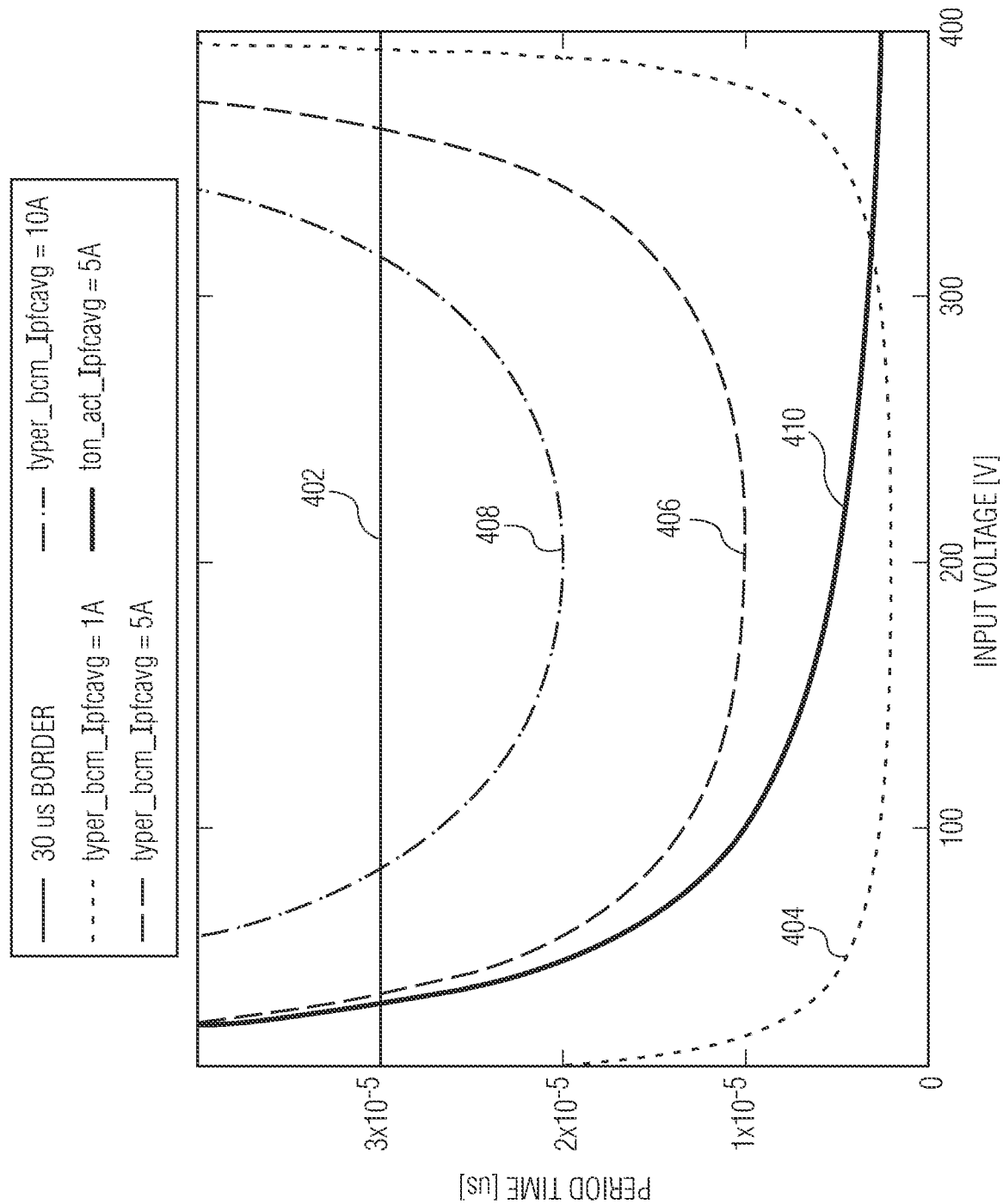
FIG. 4 is a graph of a period time against input voltage for different boost converter outputs.

FIG. 4 is a graph of a period time, $t_{per}$, on the vertical axis against input voltage on the horizontal axis for multiple different PFC current outputs in BCM mode for an example boost converter. The current limiter 106 is disabled. A solid line 402 at a period time of 30 μs (about 33.3 KHz) shows an example preferred maximum period time. Period times above this level may create distortion and even audible noise. A first curve 404 shows an average inductor current, $I_{pfc\_bcm\_avg}$, of 1 A. The boost converter is able to operate below the 30 μs threshold for a Vin of nearly 0V to almost 400V. A second curve 406 shows an average inductor current, $I_{pfc\_bcm\_avg}$, of 5 A. The boost converter is able to operate below the 30 μs threshold for a smaller range of Vin of about 50V to about 350V. A third curve 408 shows an average inductor current, $I_{pfc\_bcm\_avg}$, of 10 A. The boost converter is able to operate below the 30 μs threshold for an even smaller range of Vin of about 100V to about 300V. A fourth curve 410 shows the actual ON time, $t_{on\_act}$, of the gate for a boost converter current of 5 A. This curve shows that the ON time is large for low mains voltages and small for high mains voltages.

Figure 5:
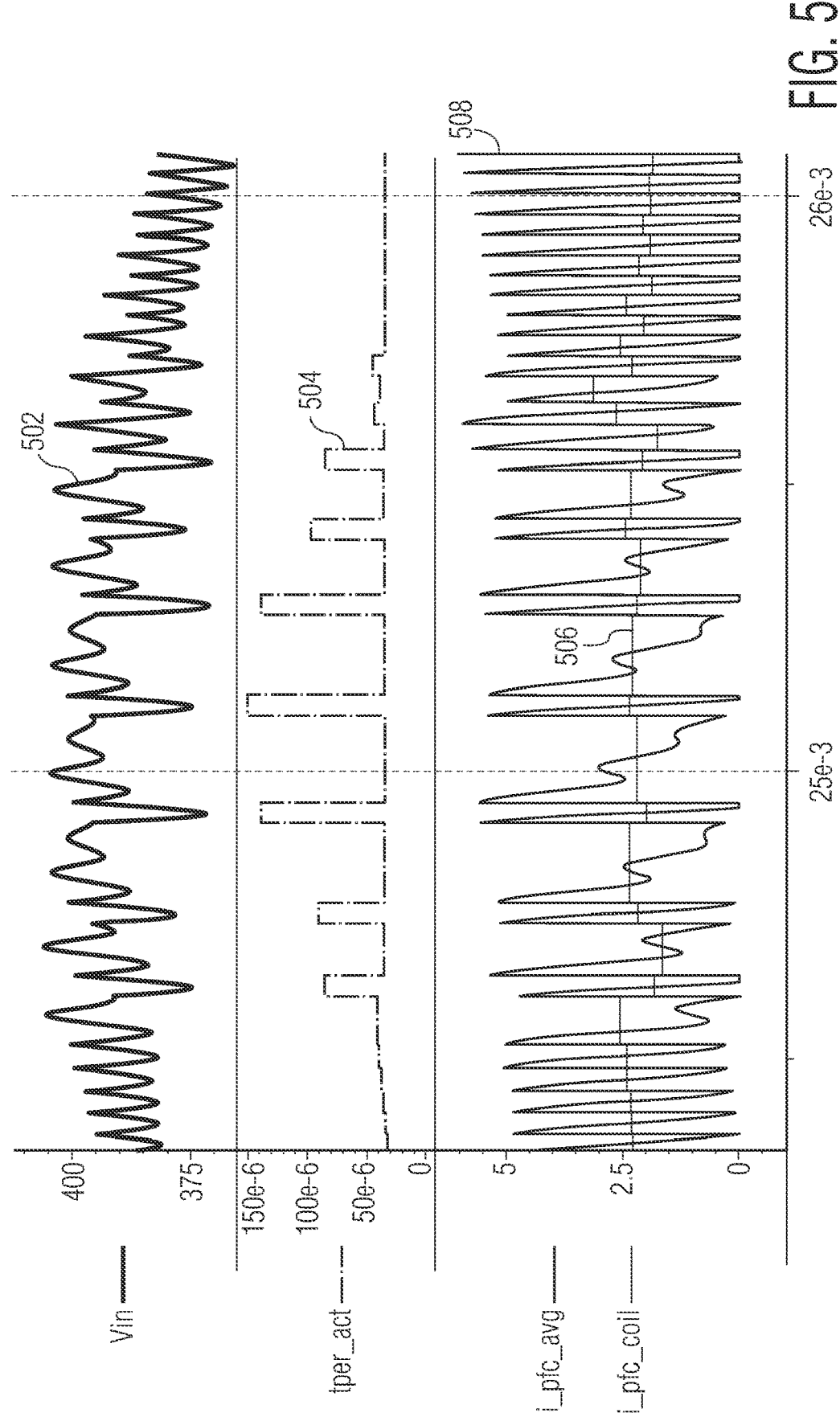
FIG. 5 is a graph of various boost converter parameters against the boost converter period time.

FIG. 5 is a graph of various boost converter parameters on the vertical axis against the boost converter period time on the horizontal axis in BCM mode for an example boost converter. The current limiter is disabled. The boost converter period time is the same parameter as on the vertical axis in FIG. 4. The top curve 502 is the input voltage, Vin. The middle curve 504 is the actual period time, $t_{per\_act}$. The bottom curve 506 is the boost converter average output current, $I_{pfc\_avg}$, superimposed on a fourth curve 508 the PFC inductor coil current, $I_{pfc\_coil}$. All of these curves are irregular in shape because the low switching frequency is close to the resonance frequency of the mains filter 122 of the boost converter 100. The irregularities may cause a noticeable THD and audible noise.

Any irregularities may be addressed by modifying the ON time of the boost converter gate, which is the control parameter of the system. For low main voltages it is easy to modify or limit the ON time and indirectly the period time. However, there are limits to modifying the ON time for high mains voltages because the period time, $t_{per}$, depends also on how long it takes for the current to reach the zero crossing. This is the duration of the secondary stroke time ($t_{sec}$). If a cycle is ended before the end of the secondary stroke, then the boost converter is operating in CCM mode. CCM mode for high mains voltages may also problematic because it stresses the boost converter diode 128.

The main difference between CCM mode as compared to DCM and BCM modes is that there is a forward current flowing through the diode in CCM operation at the moment the switch 114 is switching on. Consequently, a significant reverse current can flow when the switch is switched ON. No forward current is flowing through the diode during the ringing phase of the BCM and DCM modes, resulting in nearly no reverse current when the switch is switched ON. The reverse current flow provides for an important recovery time for the diode. A diode with a shorter reverse recovery time has, in general, a larger forward voltage and vice versa. As a larger forward voltage decreases the efficiency of the current flow through the diode, there is a trade-off in diode selection and operation for operation primarily in DCM mode as compared to CCM mode. In a typical DCM application, the forward voltage is lower and the recovery time is longer. If a typical DCM application switches in CCM mode, there is higher power dissipation, which causes inefficiency as well as heat. Too much heat may damage the diode and other components of the boost converter. The power dissipation can break the application if the diode becomes too hot. Assuming a DC current through the diode and CCM mode operation, the switching frequency has a proportional relationship to the energy dissipation.

The current limiter 106, limits the desired current which indirectly reduces the total ON time of the switch 114. This keeps the boost converter as long as possible in DCM mode at a higher frequency or in CCM mode at low currents without overloading the diode. FIG. 4, for example, shows a wider range of input voltages with lower currents. Equation 4 may be rewritten as follows, where $I_{desMaxClampIdeal}$ represents an ideal maximum current in this simulation. The actual value in a physical system may be different:

$$I_{desMaxClampIdeal} = \frac{t_{per\_act} \cdot V_{out}(1 - \delta_{ccm}) \cdot \delta_{ccm}}{2 \cdot L_{pfc}} \quad \text{(Eq. 5)}$$

Figure 6:
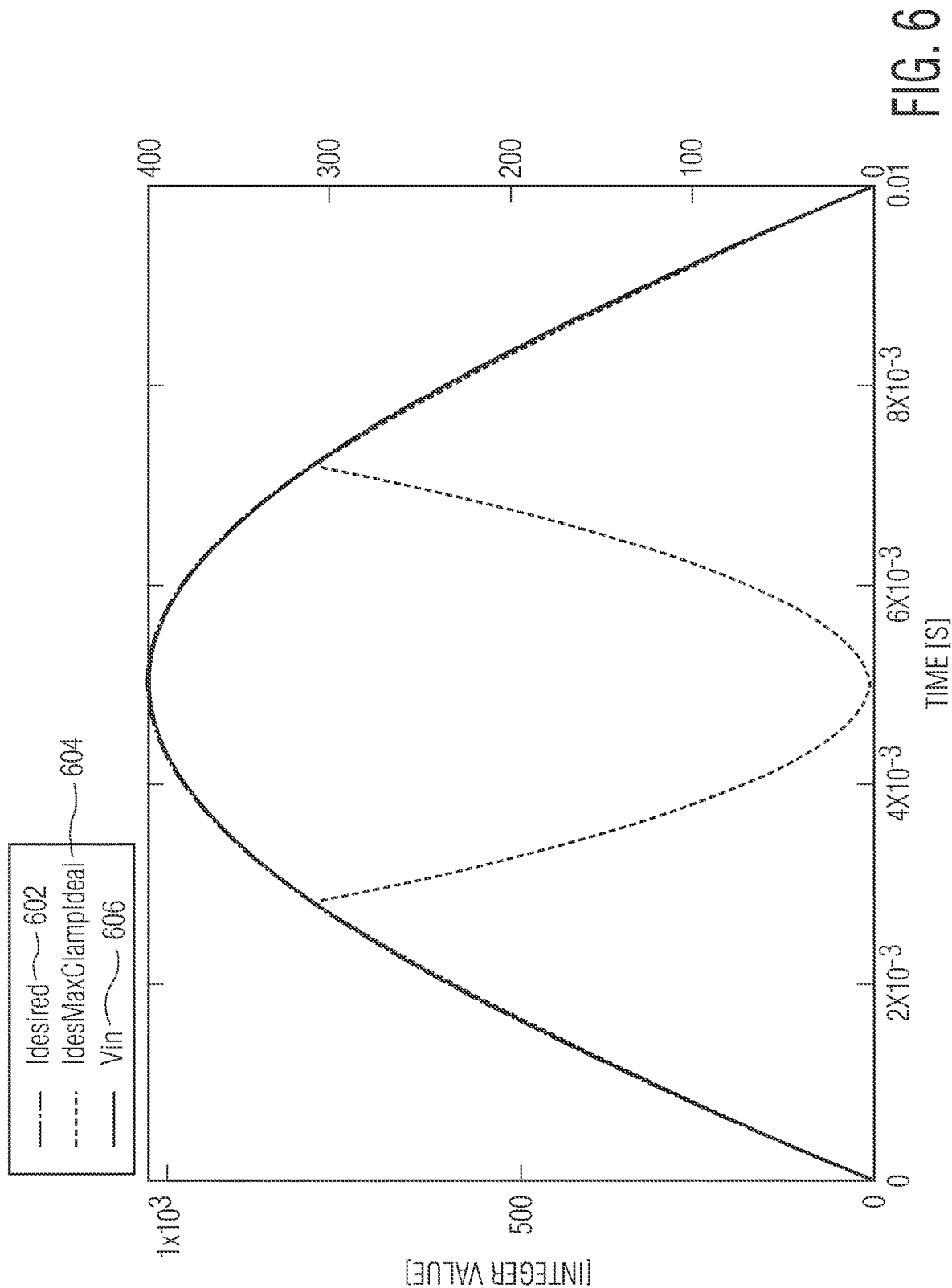
FIG. 6 is a graph of the requested input current and maximum possible input current of the boost converter against time.

The function in Equation 5 is graphed in FIG. 6 in the case of $t_{per\_act}$ set to 30 μs and Vout set to 400V. FIG. 6 is a graph of the requested input current, Ides, the maximum possible input current in BCM operation, $I_{desMaxClampIdeal}$ and the input voltage, Vin, versus the time over half a mains cycle. The input voltage is shown on the right side vertical axis and the time in seconds is shown on the horizontal axis. Current is shown as an integer value on the left side vertical axis. The desired current 602 has a zero value with a zero duty cycle time until it peaks in the center of the graph with a time of about $5 \times 10^{-3}$ and then falls with increasing the time. The ideal maximum current 604, $I_{desMaxClampIdeal}$, peaks at about 300V regardless of the input voltage, Vin, and decreases until the peak input voltage is reached.

As shown, there is a big difference at the peak of the mains between the desired current 602 and the current which can be generated. If the input voltage becomes very close to the output voltage, Vout, set to 400V, the ideal maximum current 604 becomes zero and the converter still needs to stop switching. It is better for the switching behavior and THD when the minimum current is increased and CCM mode is allowed for a low current level.

Figure 7:
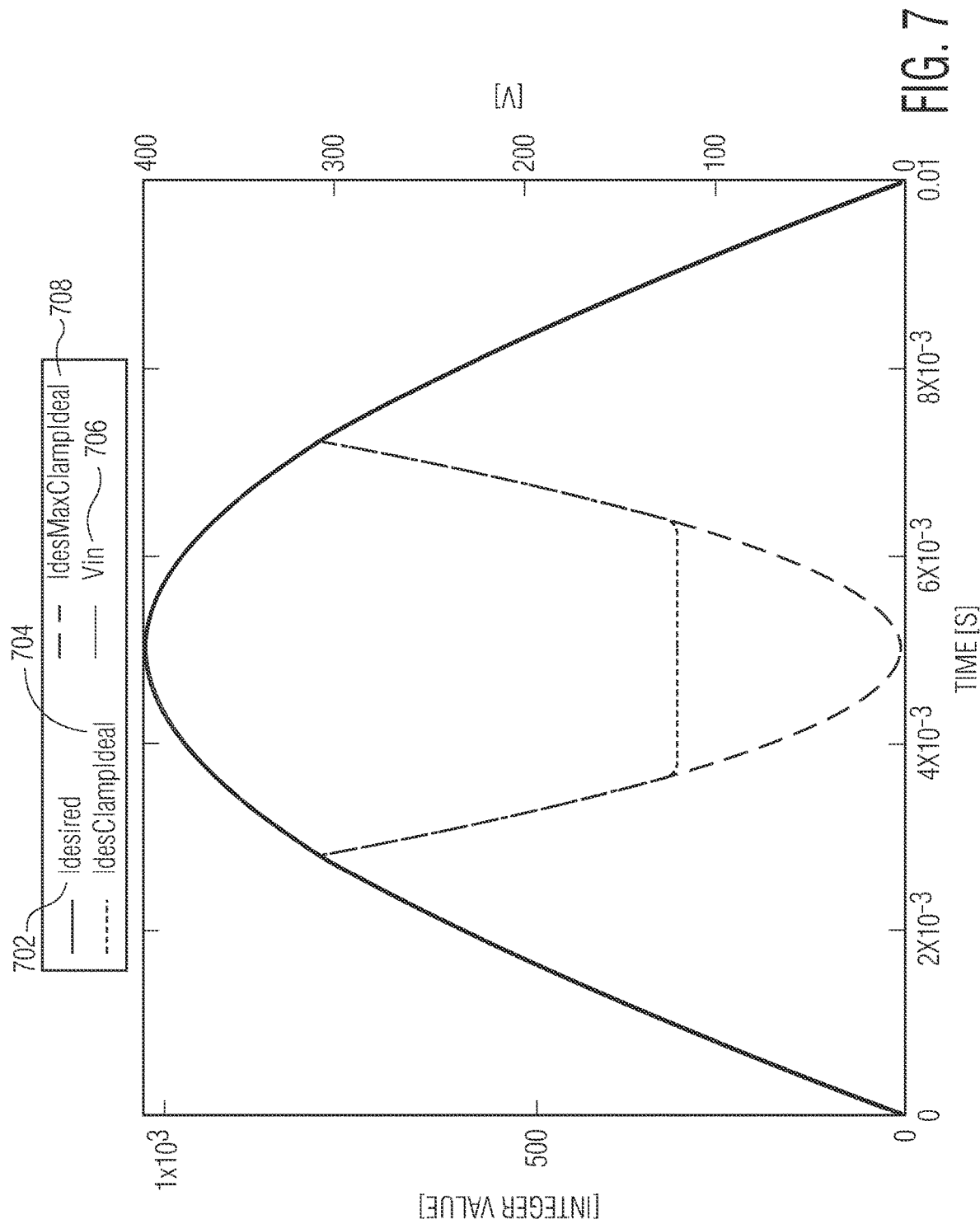
FIG. 7 is a graph of the requested input current and maximum possible input current of the boost converter and including an ideal clamp current against time.

The impact of a minimum level is shown in FIG. 7 and is based on the introduction of an ideal minimum current, IdesClampMin. This ideal minimum current increases the minimum current to prevent the dip down to zero of the ideal maximum current 604, $I_{desMaxClampIdeal}$, shown in FIG. 6. The ideal minimum current, $I_{desClaimMin}$, may be compared to the ideal maximum current 708, $I_{desMaxClampIdeal}$, to establish a floor for an ideal clamp current 704, $I_{des\_clamp\_Ideal}$, as defined in Equation 6.

$$I_{des\_clamp\_ideal} = \mathrm{MAX}[I_{desClampMin}, I_{desMaxClampIdeal}] \qquad \text{(Eq. 6)}$$

As discussed above, when the input voltage is close to the output voltage, then the current feedback loop will continue to reduce the switching frequency. In order to prevent the frequency from being too low, the controller will transition the converter operation from BCM to CCM. CCM introduces a stress on the converter diode but the stress may be mitigated. A converter may be designed to work over a different voltage range (e.g., 80V Root Mean Square (RMS) to 264V RMS). The peak current of the converter is generated for the lowest mains voltages. For higher mains voltages, the peak current is roughly a factor of 3 lower compared to a low mains voltage for the same power. If the converter output current is limited by a factor of 3 compared to the maximum current for higher mains voltages, the same amount of power can be delivered with higher mains voltages as for low mains voltages, resulting in low THD. When the power request is higher during a transient, it is also possible to deliver more power, but this over power condition will increase the THD. Comparing this to the properties of the converter diode, it is possible to protect the diode and switch in CCM at the maximum allowed period time for high mains voltages. Multiple tests show that CCM switching the converter at high mains voltages does not damage the application.

In embodiments, a PFC controller may operate in accordance with Equation 5 or Equation 6 or with a simplification or approximation. The functions may be simplified, for example, to a first order approximation. At high mains voltages, the CCM duty cycle is small. The equation may be simplified for high mains voltages, by approximating the duty cycle, e.g., $(1-\delta_{ccm})=0.8$. This approximation yields a calculation of $I_{pfc\_clamp}$ where $t_{per\_max}$ is the maximum desired period time:

$$I_{pfc\_clamp} = \frac{t_{per\_max} \cdot V_{out} \cdot 0.8 \cdot \delta_{ccm}}{2 \cdot L_{pfc}} \qquad \text{(Eq. 7)}$$

where $I_{pfc\_clamp}$ represents the clamp value for the converter current as measured at the source of the converter switch.

In embodiments, the PFC controller primarily drives the converter in DCM. DCM provides higher efficiency with less diode heating and better mains filter operation. The converter transitions to CCM switching when the period for DCM switching becomes too long. A maximum period time for DCM may be set at which the PFC controller drives the converter in CCM. This keeps the frequency above some set minimum value. In practice, due to spread, delay, and margins, the transition point may be inconsistent. Consequently, the frequency can be much higher than the minimum. An additional regulation may be used to limit CCM operation to low frequencies and quickly transition out of CCM when possible.

Figure 8:
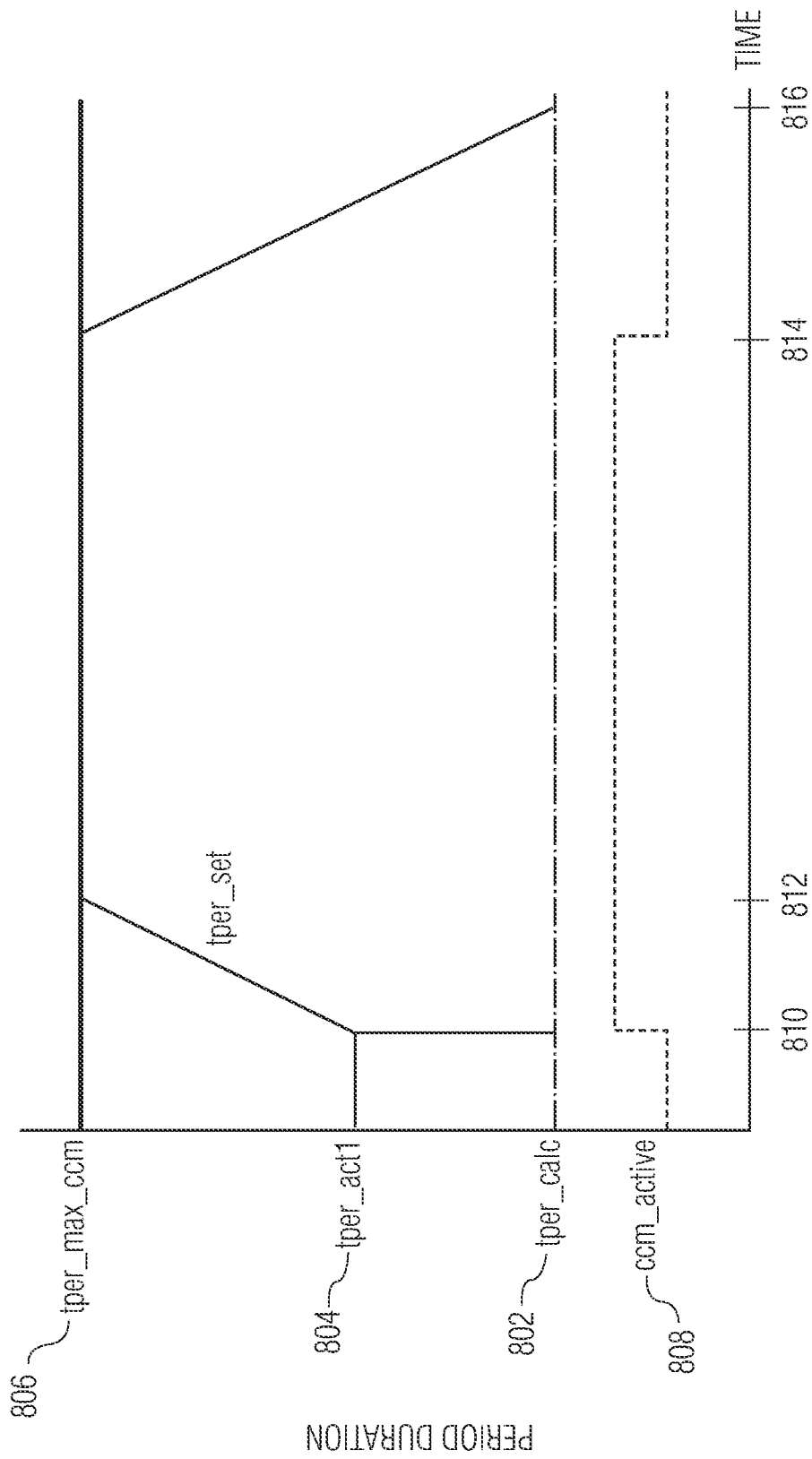
FIG. 8 is a timing diagram of the PFC controller cycle period in different operating conditions.

FIG. 8 is a timing diagram of the PFC controller cycle period or drive signal period. The operations limit the frequency of CCM operation. The tper_calc 802 represents a desired period time that has been calculated. The value is constant through time. The tper_act1 804 represents an actual period time. This is larger than the tper_calc 802. The tper_max_ccm 806 is the maximum allowed period time in CCM. The period time has an inverse and direct relationship to the frequency and, as mentioned above, the converter operates better when the switching frequency is higher than the audible range of 20 KHz and above the resonance frequency of the mains filter (which is typically in the range of 10 to 20 KHZ). This corresponds to tper_max_ccm. The specific numerical value may be adapted to suit different implementations. The ccm_active 808 represents the mode of operation. The PFC controller is able to switch between BCM and CCM and, in some implementations, also to DCM and other modes.

As shown at time 810, CCM is entered which is indicated by ccm_active 808 going high. The period of tper_act1 804 increases until it hits the maximum at time 812. The period is then regulated to below tper_max_ccm 806. At a later time 814, ccm_active 808 goes low. The controller leaves CCM and transitions to another mode such as BCM or DCM. The period decreases until arriving at time 816 at tper_calc 802. The value of tper_act1 804 will vary with changes in the load and input.

In operation the PFC controller may operate in accordance with FIG. 8 in many different circumstances. In an example, the output voltage of the converter is measured or set to a fixed value, for example 400V. The inductance of the boost converter coil ($L_{pfc}$) is measured or approximated to a fixed value. The desired period time in CCM, tper_calc 802 is set as is the maximum period time tper_max_ccm 806. In operation in DCM or BCM mode (ccm_active 808=false), the tper_calc 802 is equal to the best calculated period time. When ccm_active 808=true, the period time changes to tper_max_ccm. After ccm_active 808=false again, the actual period time will regulate back to the tper_calc.

Figure 9:
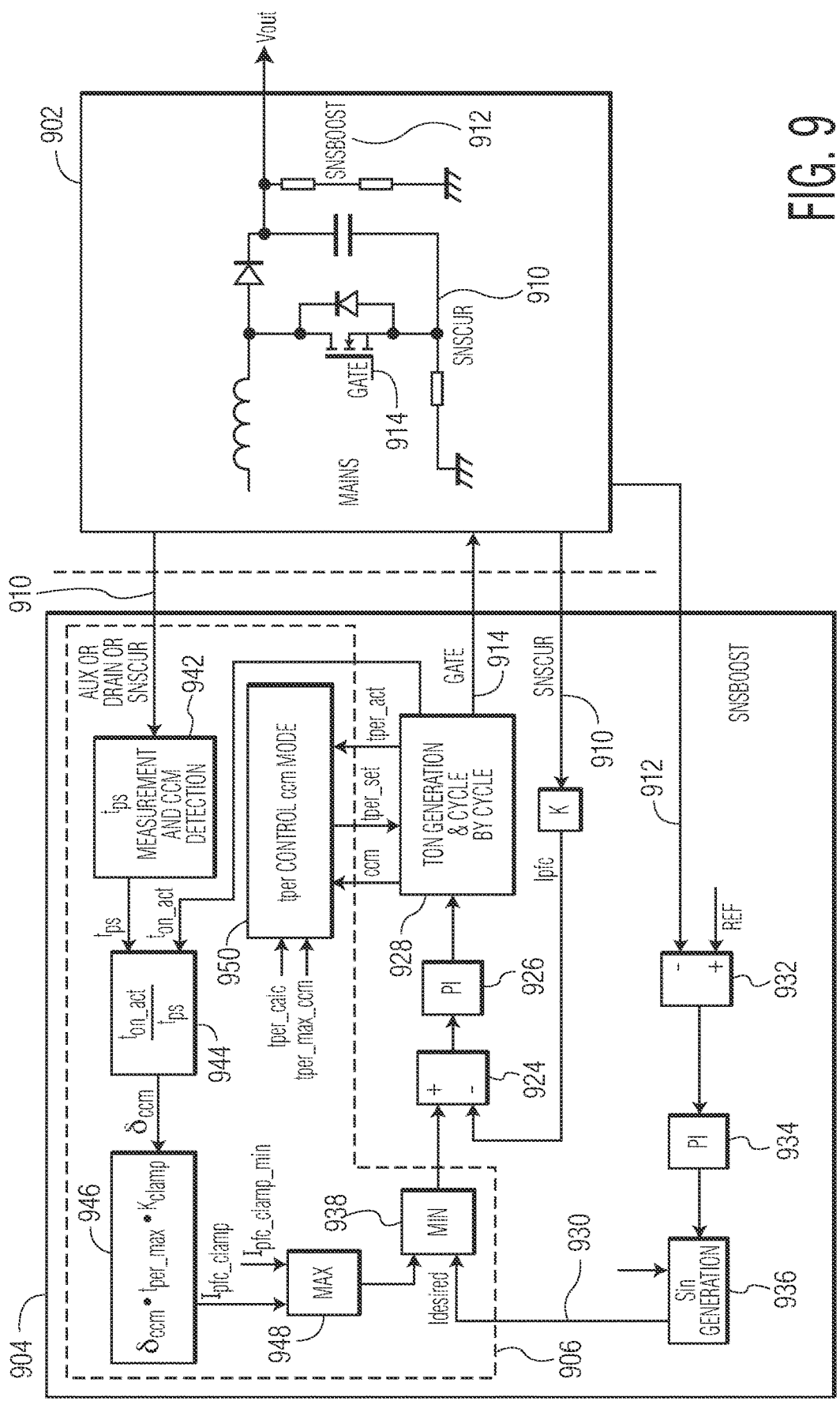
FIG. 9 is a block diagram of a boost converter with a PFC controller and a current limiter.

FIG. 9 is a block diagram of a boost converter with PFC controller and a current limiter. An application 902 is controlled by a controller 904. The structure and configuration are the same as or similar to that of FIG. 1 with less detail of the application 902 and more detail of a current limiter 906 of the controller 904. The application 902 receives mains power or other power and converts it to an output voltage Vout using a boost converter structure such as that shown in FIG. 1. The controller receives a sensed current 910 as a SnsCur signal from the source of the switch, an output voltage 912 as a SnsBoost signal, from a voltage divider coupled to the output voltage, and a drive signal 914 generated by the controller. The values of other parameters may be used instead of these three or in addition to these three as discussed herein. As an example, the voltage of the auxiliary winding or the voltage of the converter's inductor or the drain voltage may be used instead of the source current depending on the implementation.

As in the example of FIG. 1, FIG. 9 shows an inner control loop 920 configured to regulate the input current of the boost converter to the desired current (Ides) from the current limiter 906. The inner control loop receives the SnsCur signal from the converter and compares it to the desired current (Ides) at an inner difference circuit 924. A constant or pre-determined value, K, at a register 922 may be used during some operational conditions. The constant K may be set such that the output is the actual boost converter current. The inner difference circuit 924 is coupled to an inner proportional integrator 926 which integrates the error signal from the inner difference circuit 924 and provides the integrated value to the gate driver 928. The gate driver 928 uses the integrated value together with other data to determine the timing and duration of the drive signal 914.

An outer control loop 930 is configured to drive the output voltage Vout or SnsBoost of the converter to a desired value (e.g., 400V). The outer control loop 930 receives an output voltage measurement, for example, SnsBoost from the converter and compares the voltage to a reference voltage, Ref, at an outer difference circuit 932. The outer difference circuit 932 is coupled to an outer proportional integrator 934 that receives the error signal. The outer proportional integrator 934 is coupled to a current generator 936. The current generator 946 generates a desired current value that is coupled to the inner control loop 920 through the current limiter 906.

The current limiter 906 compares the outer control loop 930 current output of the current generator 936 to a clamp current in a current limiter selector 938 with a minimum function. The selected current is applied to the inner control loop 920 difference circuit 924. The error signal from the difference circuit 924 is applied through the inner control loop 920 to adjust the drive signal generated in the gate driver 928. Under many operating conditions, such as in BCM and DCM, the current limiter 906 will not affect the operation of the gate driver 928.

When the input voltage, Vin, is close to the output voltage, Vout, and the converter switching frequency is low, the current limiter 906 may affect the operation of the gate driver 928. To decrease the period, the requested current may be decreased. This decreases the ON time which may decrease the period. The input voltage and the output voltage may be compared directly, similar to what is shown in FIGS. 6 and 7. Alternatively, a duty cycle may be used, as shown in Equation 3, to infer the relationship between the input voltage and the output voltage. A cycle signal such as SNSCUR is received at a $t_{ps}$ measurement and CCM detection block 942. Any suitable cycle signal from the converter such as the source current of the converter switch, the drain voltage of the converter switch, the current or voltage at the converter inductor, or other signal may be used as a signal to measure the time period of the converter cycle. This measurement is shown, for example, in FIG. 2 for different modes. In a similar way, operation in CCM may also be determined using a suitable cycle signal.

The $t_{ps}$ measurement and CCM detection block 942 sends the $t_{ps}$ measurement to a divider 944. The divider 944 also receives the actual on time, $t_{on}$, which is the primary stroke of a duty cycle of the converter when the switch is active, from the gate driver 928. The divider divides these two inputs to determine the duty cycle in CCM, $\delta_{CCM}$, as indicated in Equation 3. The duty cycle is sent to a current generator 946 which determines a current clamp value, $I_{pfc\_clamp}$, as defined in Equation 7. In Equation 7, Vout, the output voltage 912 corresponds to the SNSBOOST signal that is applied to and available from the outer control loop 930. $L_{pfc}$ is the inductance of the converter inductor and is a constant. The value for $t_{per\_max}$ is the maximum desired period time and Kclamp is a constant.

A value for Kclamp may be determined in different ways to suit any implementation. In some embodiments, Kclamp may be determined as follows:

$$K_{clamp} = \frac{V_{out} \cdot 0.8}{2 \cdot L_{pfc} \cdot N_{stages}} \cdot K_{slope} \qquad \text{(Eq. 8)}$$

wherein Nstages refers to the number of converters and Kslope is a tunable parameter.

Considering Equation 8 in more detail, the output voltage, Vout, of the converter can be measured or set to a fixed value (for example 400V). The inductance value of the boost converter coil ($L_{pfc}$) can also be measured or a fixed value may be used. The value of Nstages sets the number of boost converter stages, which is 1 for an application with 1 converter and 2 for an application with an interleaved PFC boost converter and so on. The Kslope gives a possibility to adjust the ideal curve. Ideally this may be set to 1, but in practice 0.5 is a better Kslope value in combination with the transient response The current clamp value $I_{pfc\_clamp}$ from the generator is coupled to a comparator 948 which performs a maximum function to select the greater of the current clamp value and a minimum clamp value, $I_{pfc\_clamp\_min}$. The minimum input current clamp value may be pre-determined constant. The result is then applied to the current limiter selector 938 as a possible minimum input current. The current limiter comparator selects the least of the desired input current, $I_{desired}$, from the outer control loop 930 current generator 936 and the current limiter input current clamp output. The least of these is the minimum input current that is applied to the inner control loop 920.

The current limiter in the example of FIG. 9 has the effect of reducing the desired current, $I_{desired}$, input from the outer control loop 930 to the inner control loop 920 under certain circumstances, such as when Vin is close to Vout. A period time controller 950, tper control CCM, of the current limiter also operates to regulate the period time of the drive signal 914 when the converter is operating in CCM. As shown the period time controller 950 receives the actual period time $t_{per\_act}$, the calculated period time, $t_{per\_calc}$, the maximum period for CCM, $t_{per\_max\_CCM}$, and a CCM status, i.e., whether the gate driver 928 is operating the converter in CCM. The period time controller 950 is able to generate a value for a requested drive signal period, $t_{per\_set}$, that is provided to the gate driver 928.

The period time controller 950 controls the value of the requested period time, $t_{per\_set}$. In normal operation in DCM or BCM mode (CCM=false), the requested period time $t_{per\_set}$, is equal to the best calculated period time, $t_{per\_calc}$. When CCM is detected (CCM=true), the period time will change to $t_{per\_max\_ccm}$. When CCM is no longer detected (CCM=false), the period time will regulate back to the calculated period time, $t_{per\_calc}$. This operation is shown in the example of FIG. 7 and as described above.

Figure 10:
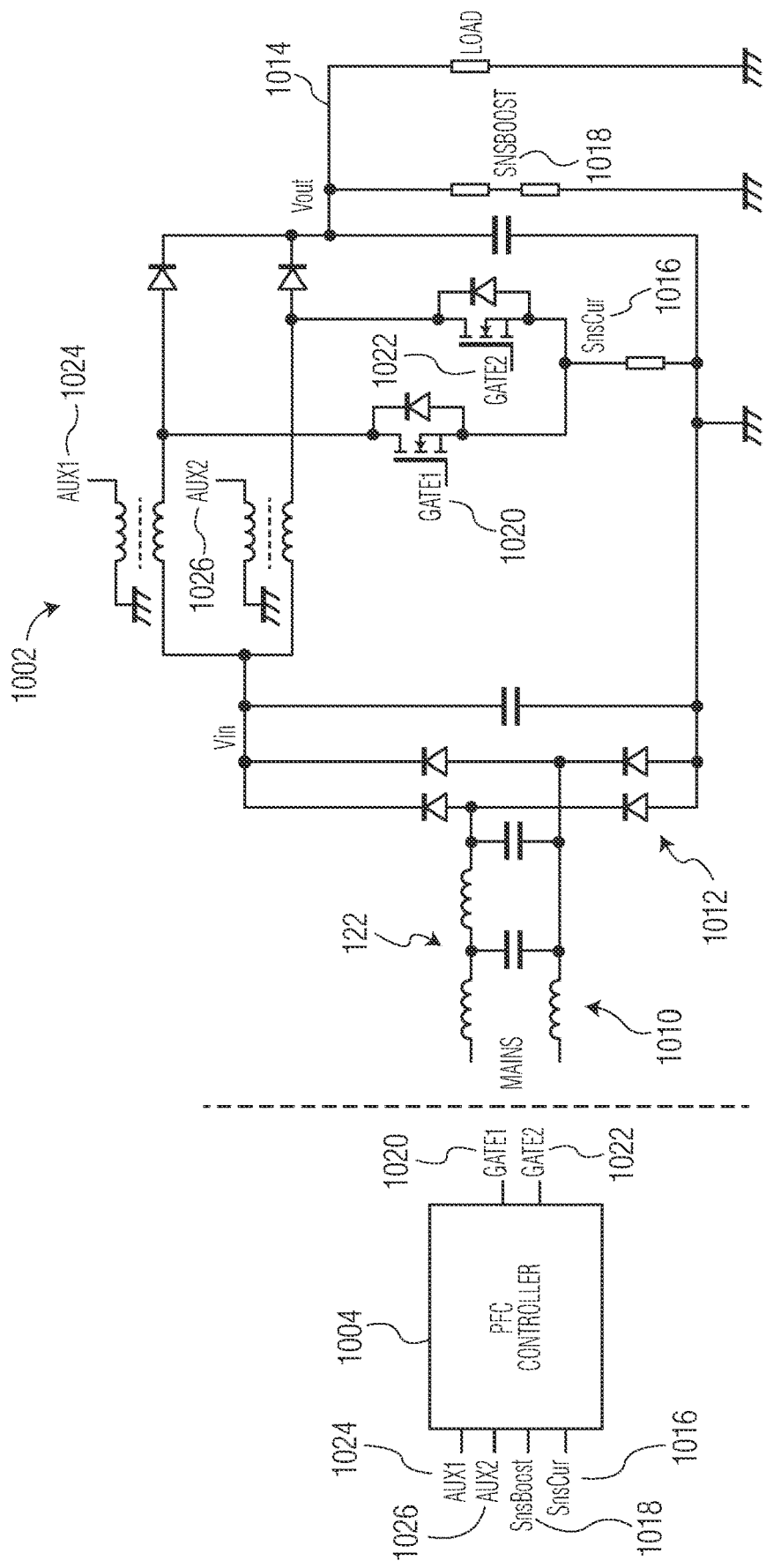
FIG. 10 is a block diagram of an interleaved boost converter with a PFC controller and a current limiter.

The principles, structures, and techniques described herein may be adapted for multiple stages that are combined to form a single boost converter. FIG. 10 is a block diagram of an interleaved PFC boost converter 1002 controlled by an interleaved PFC controller 1004. The interleaved PFC boost converter receives an AC power input at an input filter 1010. This may be from mains power supply or any other power supply. The AC power is passed from the input filter to a rectifier 1012, for example a diode bridge rectifier. An output voltage, Vout, 1014 is generated by the interleaved PFC boost converter and the current voltage level is measured at a voltage divider to generate a SnsBoost signal 1018. The output current is measured to generate a SnsCur signal 1016.

The interleaved PFC boost converter receives a DC power supply from the rectifier 1012 at each of two switches through a respective inductor. The drains of the switches are coupled though respective output diodes the voltage output. The sources of the switches are coupled together and the SnsCur signal is measured at that node. The inductors each have a sensor to generate an AUX 1 signal 1024 and an AUX 2 signal 1026, respectively which represents the voltage of an auxiliary winding of the respective inductor as discussed above.

The information from the interleaved PFC boost converter 1002 is provided to the controller 1004 to generate drive signals 1020, 1022 to control the switches of the interleaved PFC boost converter. In some embodiments, the switches are independently controlled and a phase control loop drives the switches toward opposite phase or a 180° operational difference. With the described signals, a different current limit may be applied to each converter. While the SnsBoost signal 1018 and the SnsCur signal 1016 are the same for both stages, the AUX 1 signal 1020 is different from the AUX 2 signal 1022. These two signals allow a different duty cycle, $\delta_{CCM}$, to be determined for each stage. Accordingly, the drive signals 1020, 1022 may also be different. More than one or two stages may similarly be used to suit different applications.

As described herein, the maximum allowed current of a boost converter may be modified based on measuring the duty cycle of the converter. The duty cycle may be determined by comparing an on time, $t_{on}$, of a switch of the converter to the full period, $t_{ps}$, of a cycle of the switch. The comparison may be made, for example as a ratio ($t_{on}/t_{ps}$). The duty cycle may also be determined by measuring the input voltage to the converter and the output voltage of the converter.

The maximum allowed current may be selected to be proportional to the duty cycle. For CCM switching, the maximum allowed current may also be clamped to a minimum level. For CCM switching, the period time of the converter may be regulated to a lowest acceptable period time, $t_{per}$. For BCM and DCM switching, the period time of the converter may be regulated to a requested period time. The period time may be modified indirectly by reducing the ON time of the converter switch. The ON time is often used to control the requested current, so that reducing the requested current reduces the ON time.

The period time may be a constant. Alternatively, it may be dependent on a frequency setpoint. The period time regulation and current adaptation described herein may be applied to converter with many different numbers of converters and states.

Figure 11:
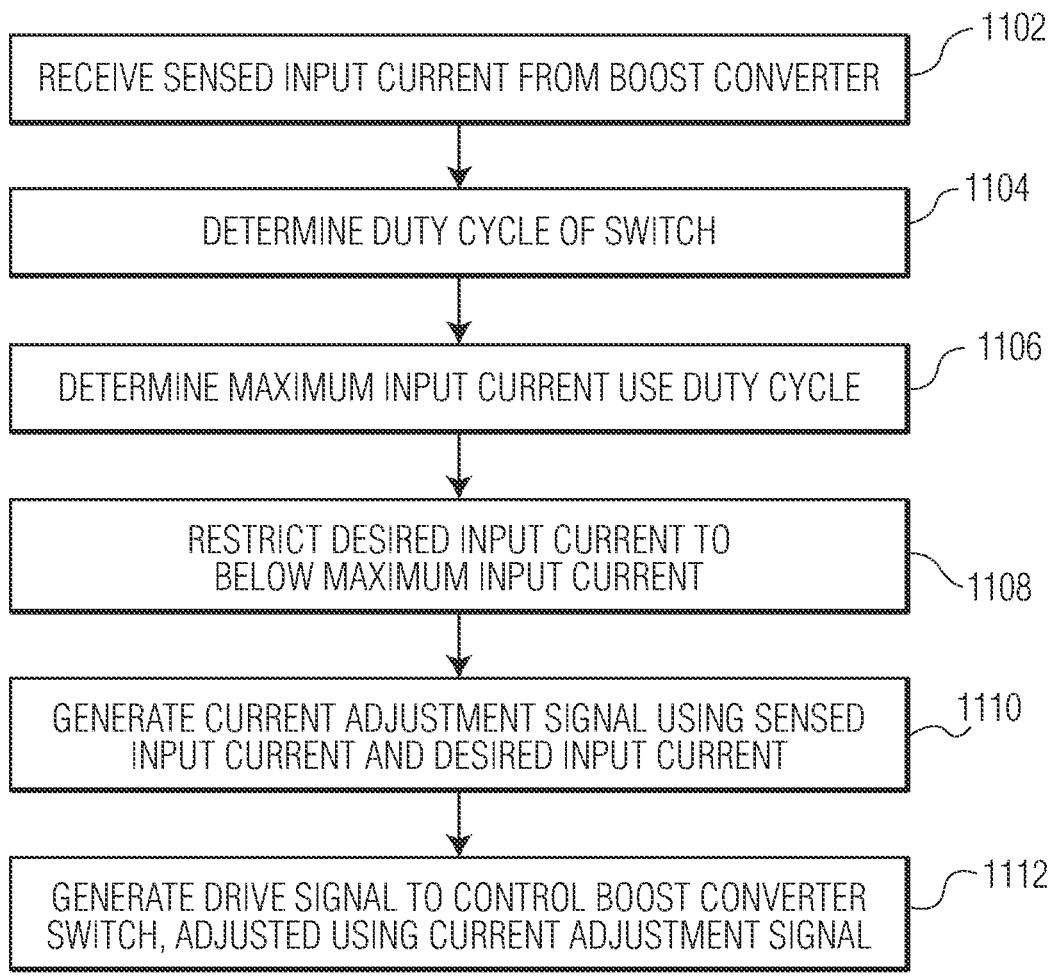
FIG. 11 is a process flow diagram of adjusting a current in a controller using the duty cycle of the switch of the boost converter.

FIG. 11 is a process flow diagram of adjusting a current in a controller using the duty cycle of the switch of the boost converter. At 1102 the controller performs receiving a sensed input current from a boost converter. The sensed input current may be determined by sensing current through the coil of the boost converter. At 1104, the controller performs determining a duty cycle of the switch. At 1106, the controller performs determining a maximum input current using the duty cycle. At 1108, the controller performs restricting a desired input current to below the maximum input current. At 1110, the controller performs generating a current adjustment signal using the sensed input current and the desired input current; and at 1112, the controller performs generating a drive signal to control switching of the switch of the boost converter. The drive signal has a period and an ON time and the period of the drive signal is adjusted using the current adjustment signal.

The connections as discussed herein may be any type of connection suitable to transfer signals or power from or to the respective nodes, units, or devices, including via intermediate devices. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. The term "coupled" or similar language may include a direct physical connection or a connection through other intermediate components even when those intermediate components change the form of coupling from source to destination.

The described examples may be implemented on a single integrated circuit, for example in software in a digital signal processor (DSP) as part of a radio frequency integrated circuit (RFIC). The described examples may also be implemented in hardware in a field programmable gate array (FPGA) or application specific integrated circuit (ASIC), or in other electronic devices. The described examples may be implemented in analog circuitry, digital circuitry, or a combination of analog and digital circuitry. Alternatively, the circuit and/or component examples may be implemented as any number of separate integrated circuits or separate devices interconnected with each other in a suitable manner. These examples may alternatively be implemented as soft or code representations of physical circuitry or of logical representations convertible into physical circuitry, such as in a hardware description language of any appropriate type.

Boundaries between the above-described operations are provided as examples. Multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A boost converter control system comprising:
   a gate driver coupled to a switch of a boost converter to generate a drive signal to control switching of the switch, the drive signal having a period and an ON time, wherein a period of the drive signal is adjusted using a current adjustment signal;
   a current control loop coupled to the gate driver to receive a sensed input current from the boost converter and a desired input current and to generate the current adjustment signal to the gate driver; and
   a current limiter coupled to the gate driver and the current control loop to determine a duty cycle of the switch, to determine a maximum input current in response to the duty cycle, and to restrict the desired input current to below the maximum input current.

2. The boost converter control system of claim 1, wherein the current limiter determines the duty cycle of the switch by comparing the drive signal period and the drive signal ON time.

3. The boost converter control system of claim 2, wherein the boost converter has a power phase with a primary stroke during the drive signal ON time during which the switch of the boost converter is enabled and a secondary stroke during which the switch of the boost converter is not enabled, wherein comparing the drive signal period and the drive signal ON time comprises comparing a duration of the primary stroke and a duration of the power phase.

4. The boost converter control system of claim 3, wherein the current limiter is coupled to a sensor of the boost converter to receive a measurement of the duration of the power phase.

5. The boost converter control system of claim 4, wherein the sensor comprises a current sensor to measure the sensed input current.

6. The boost converter control system of claim 4, wherein the sensor comprises a current sensor coupled to an inductor of the boost converter.

7. The boost converter control system of claim 4, wherein the sensor comprises a voltage detector coupled to a drain of the switch of the boost converter.

8. The boost converter control system of claim 1, wherein the current limiter determines the duty cycle of the switch by comparing an input voltage of the boost converter and an output voltage of the boost converter.

9. The boost converter control system of claim 1, wherein the maximum input current is proportional to the duty cycle.

10. The boost converter control system of claim 1, wherein the current limiter further determines a minimum input current and wherein the current limiter selects the greater of the maximum input current and the minimum input current as the maximum input current.

11. The boost converter control system of claim 10, wherein the minimum input current is a pre-determined constant.

12. The boost converter control system of claim 1, wherein the current limiter further determines when the boost converter is operating in a continuous conduction mode and wherein the current limiter restricts the desired input current only in response to the boost converter operating in the continuous conduction mode.

13. The boost converter control system of claim 12, wherein the current limiter determines when the boost converter is operating in the continuous conduction mode by receiving a signal from the gate driver.

14. The boost converter control system of claim 1, wherein the current limiter further determines when the boost converter is operating in a continuous conduction mode, wherein the current limiter is further to send a value for a requested drive signal period to the gate driver when the boost converter is operating in the continuous conduction mode, and wherein the drive signal period is determined by the drive signal period value.

15. The boost converter control system of claim 1, further comprising a voltage control loop to regulate an output voltage of the boost converter using a sensed output voltage of the boost converter.

16. The boost converter control system of claim 1, wherein the sensed input current is determined by sensing current though a coil of the boost converter.

17. A method comprising:
   receiving a sensed input current from a boost converter;
   determining a duty cycle of a switch;
   determining a maximum input current using the duty cycle;
   restricting a desired input current to below the maximum input current;
   generating a current adjustment signal using the sensed input current and the desired input current; and
   generating a drive signal to control switching of the switch of the boost converter, the drive signal having a period and an ON time, wherein the period of the drive signal is adjusted using the current adjustment signal.

18. The method of claim 17, wherein determining the duty cycle comprises comparing the drive signal period and the drive signal ON time.

19. The method of claim 18, wherein comparing the drive signal period and the drive signal ON time comprises comparing a duration of a primary stroke during the drive signal ON and a duration of a power phase of the boost converter, the power phase including the duration of the primary stroke during which the switch of the boost converter is enabled and a secondary stroke during which the switch of the boost converter is not enabled.

20. The method of claim 17, wherein determining the duty cycle comprises comparing an input voltage of the boost converter and an output voltage of the boost converter.

* * * * *